Figure 1:
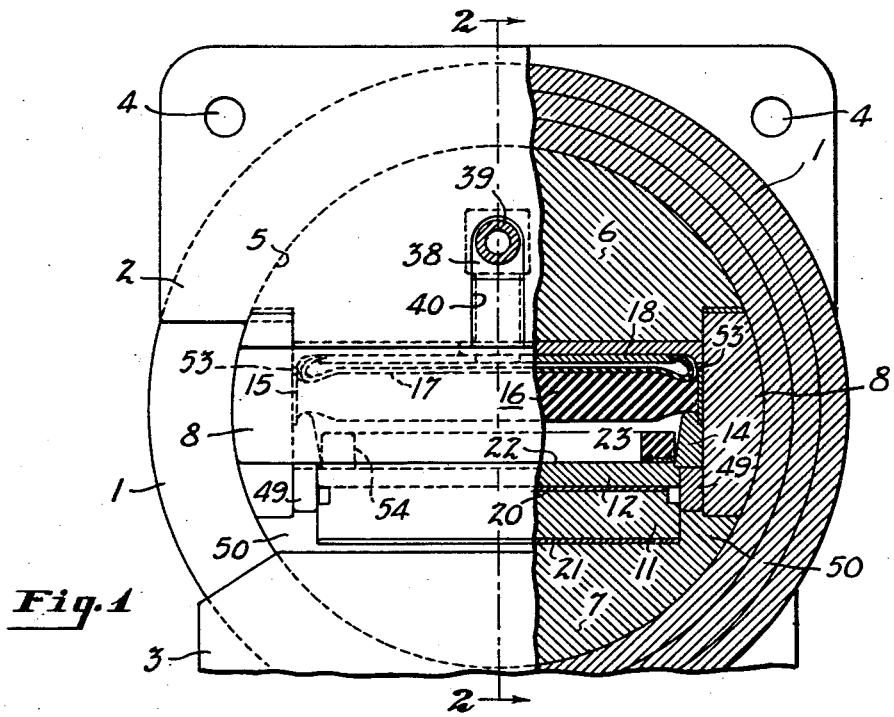

INVENTORS
Walter A. Hartz
Paul O. Pfeiffer
Charles O. Slemmons
BY McCoy, Greene & te Grootenhuis
ATTORNEYS Oct. 31, 1961 P. O. PFEIFFER ET AL 3,006,306
HYDRAULIC PRESS
Filed Feb. 7, 1956 5 Sheets-Sheet 2

INVENTORS
Walter A. Hartz
Paul O. Pfeiffer
Charles O. Slemmons
BY McCoy, Greene & Te Grotenhuis
ATTORNEYS Oct. 31, 1961 P. O. PFEIFFER ET AL 3,006,306
HYDRAULIC PRESS
Filed Feb. 7, 1956 5 Sheets-Sheet 3
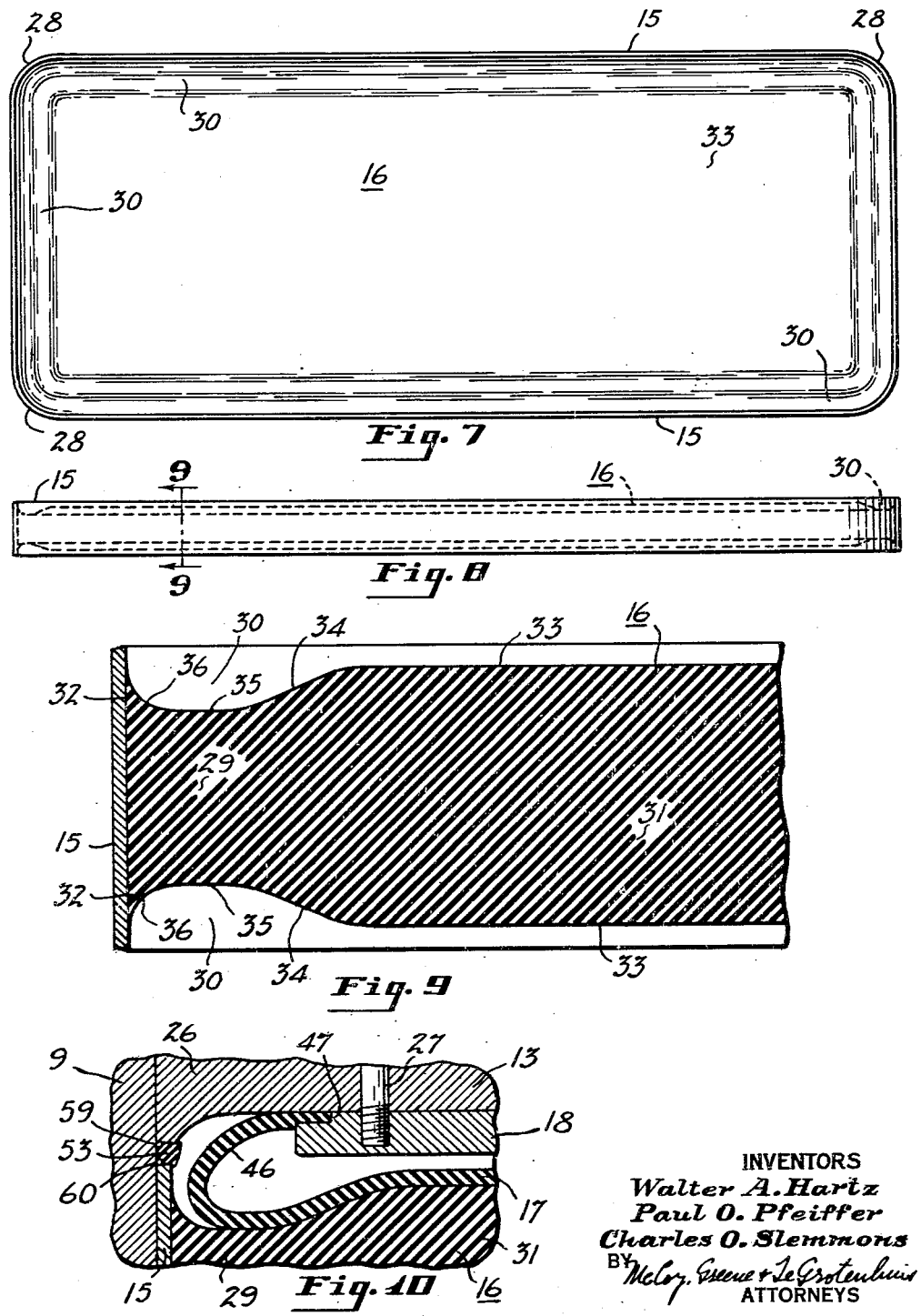
INVENTORS
Walter A. Hartz
Paul O. Pfeiffer
Charles O. Slemmons
BY
ATTORNEYS

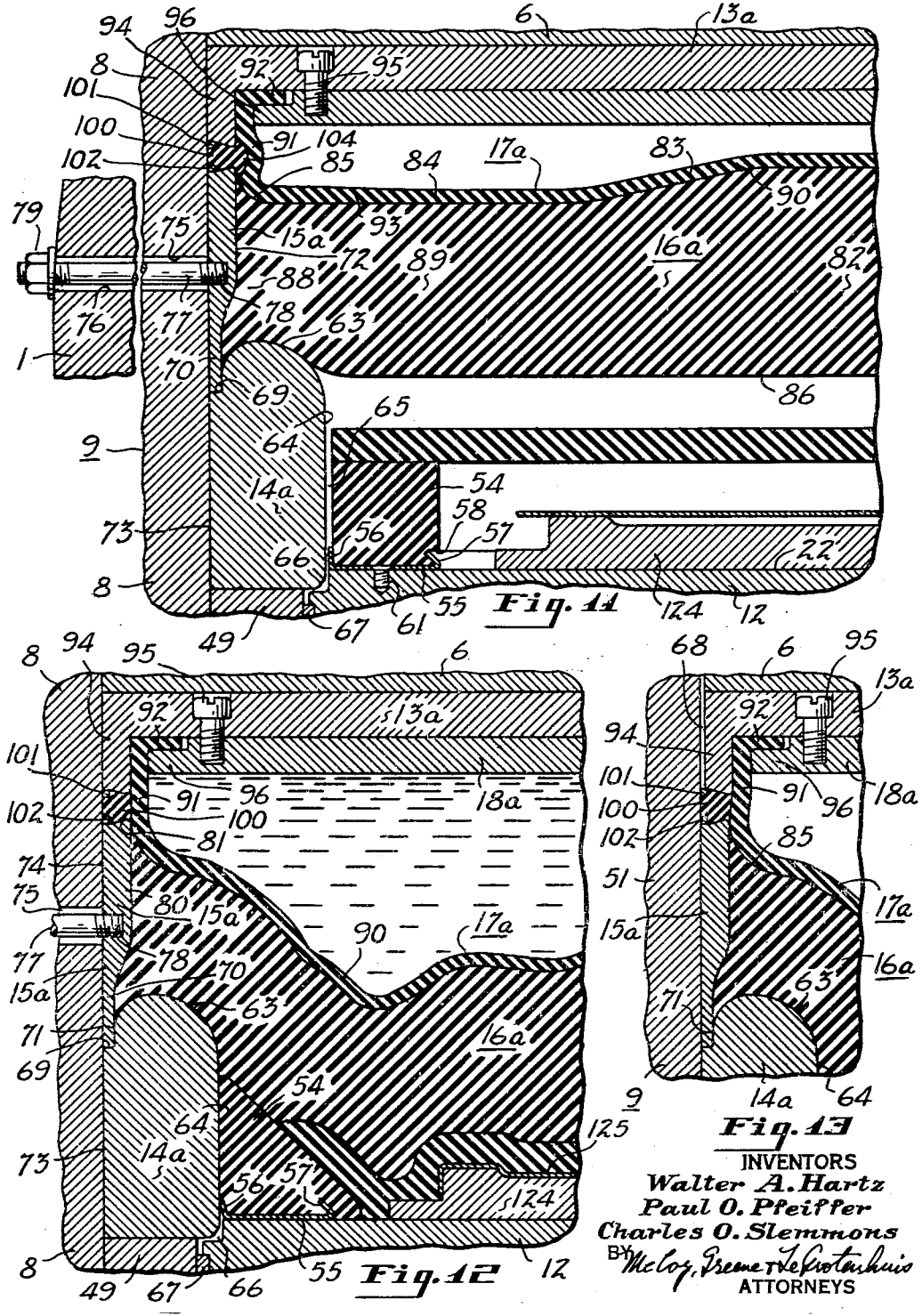

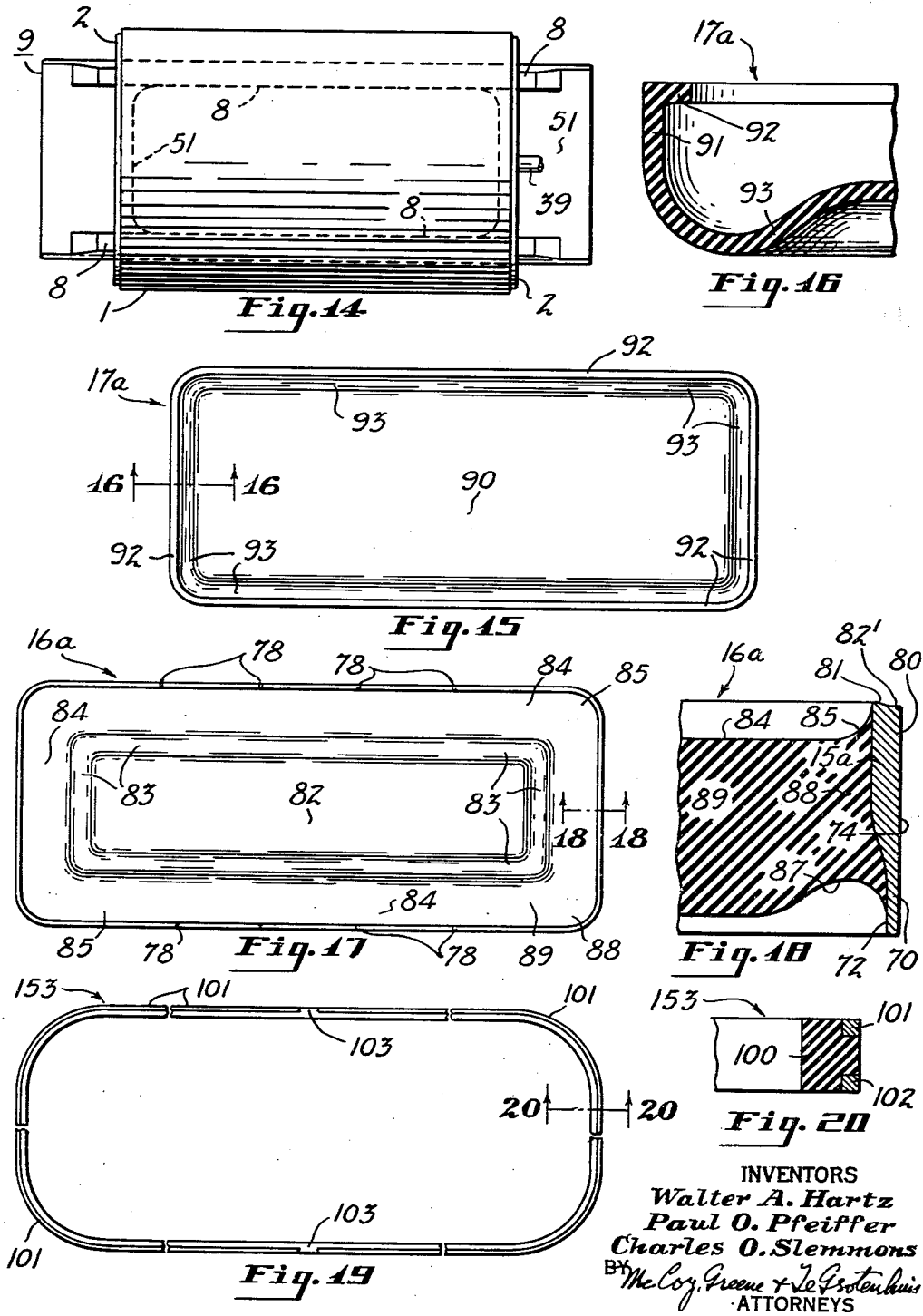

United States Patent Office 3,006,306
Patented Oct. 31, 1961

3,006,306
HYDRAULIC PRESS
Paul O. Pfeiffer, Cuyahoga Falls, and Charles O. Slemmons and Walter A. Hartz, Akron, Ohio, assignors to The General Tire and Rubber Company, Akron, Ohio, a corporation of Ohio
Filed Feb. 7, 1956, Ser. No. 563,984
5 Claims. (Cl. 113—44)

The present invention relates to an improved hydraulic press and more particularly to a press of simple inexpensive design constructed so that the rubber parts thereof function efficiently and have a maximum useful life.

In the press of this invention, an elastic rubber forming pad is provided which is bonded to a rigid rim member and gradually reduced in thickness near the rim member to facilitate flexing of the pad and to prevent rupturing of the bond between the pad and the rim member. The rim member is held against movement relative to the press frame so that the marginal edge of the forming pad does not move during operation of the press.

A thin rubber diaphragm is employed above the forming pad to provide an expansible pressure chamber for receiving hydraulic fluid under pressure. When the fluid is under high pressure during forming of articles in the press, there is a tendency to extrude the rubber of the forming pad and the diaphragm through any small openings between metal parts of the press. The press of the present invention is designed to prevent extrusion of the rubber diaphragm and to reduce damage to the forming pad due to changes in its shape during the forming operations.

According to the invention, inextensible means are provided for preventing such extrusion of the diaphragm between the rigid peripheral rim member of the forming pad and the press frame, such means limiting the movement of the diaphragm so that portions thereof are not pinched between metal parts of the press and damaged during operation of the press. Said inextensible means preferably comprises one or more strips of metal or other solid non-deformable material extending around the periphery of the rigid rim member at the top of said rim member. Each metal strip is too large to move into the narrow cracks between metal parts of the press and is located to prevent extrusion of rubber into these cracks. The metal strips are bonded to one or more strips of rubber which fill the space between the rigid peripheral rim member of the forming pad and the overlying metal portions of the press so that the rubber diaphragm is not extruded a substantial distance into this space when high pressure is applied to the pad.

Strips of metal with rubber attached thereto are preferably employed at the margin of the article-receiving space below the rubber forming pad to limit the downward movement of the pad near said margin and to reduce stresses on the pad.

The forming pad will last for long periods of time without the use of rubber throw pads or facings of abrasion-resistant rubber to protect the pad. However, the pad will usually last several times as long when throw pads are used so that the pad does not contact the articles being formed and is not cut or otherwise damaged substantially by the articles.

An object of the invention is to provide a hydraulic press of simple construction which is easy to assemble and disassemble and which will operate for a maximum period of time without replacement of the rubber parts thereof.

Figure 2:
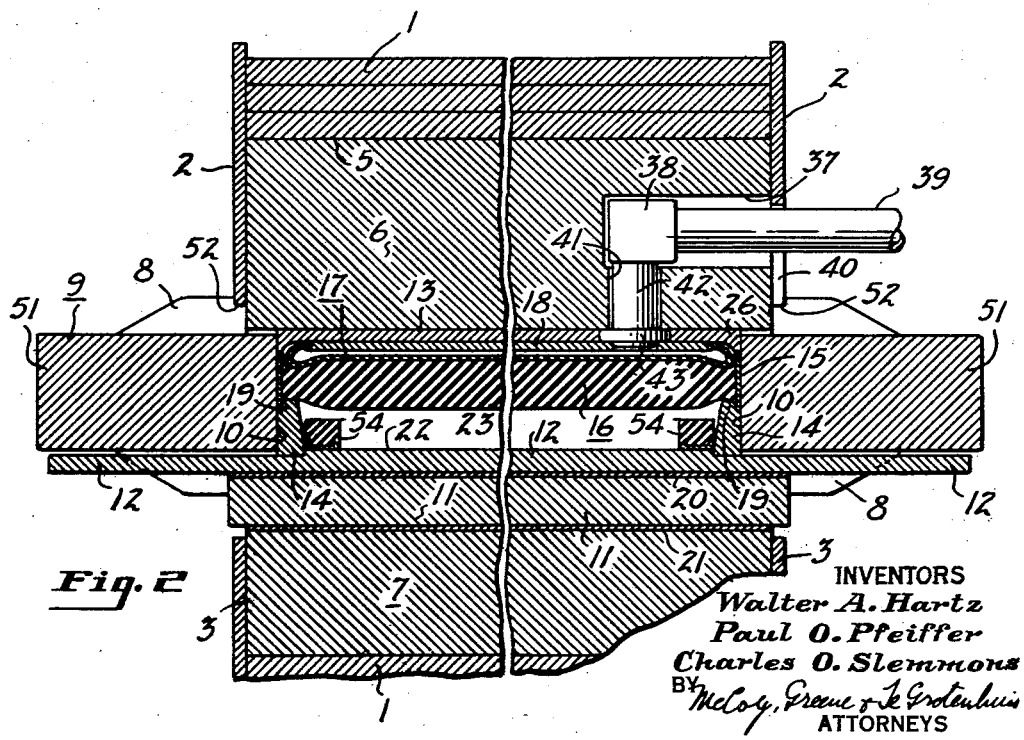
Figure 3:
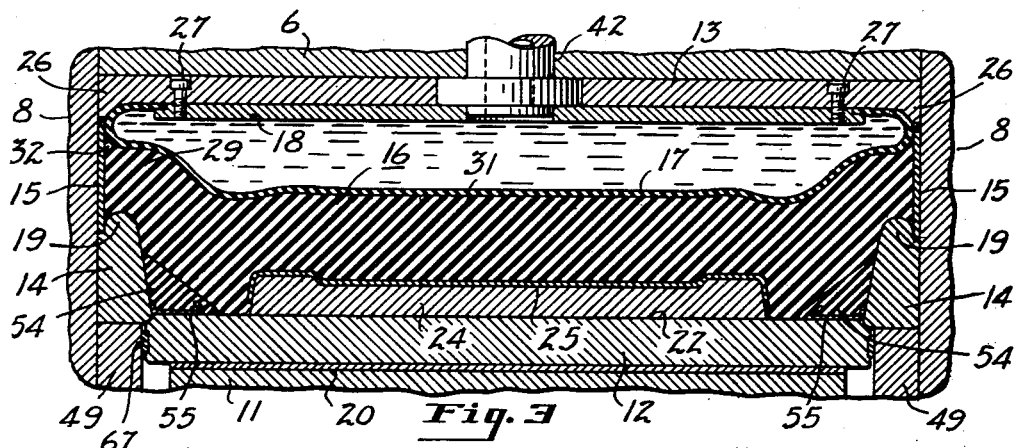
Figure 4:
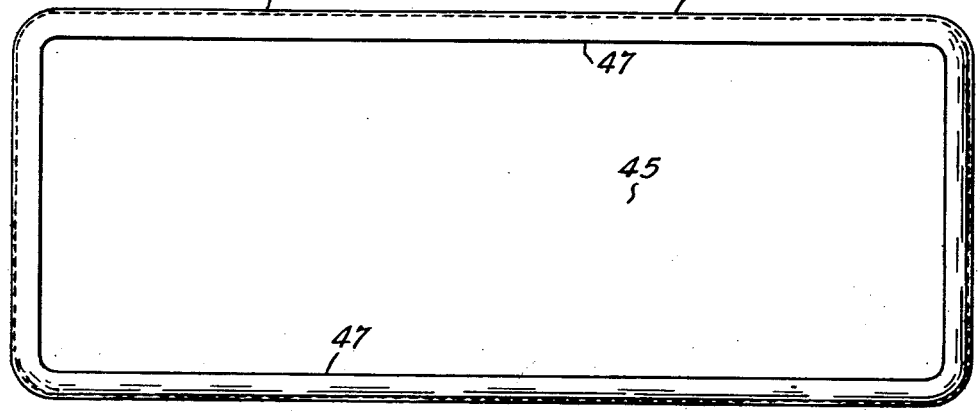
Figure 5:
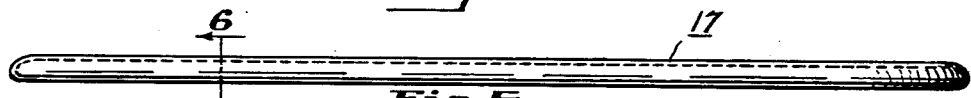
Figure 6:
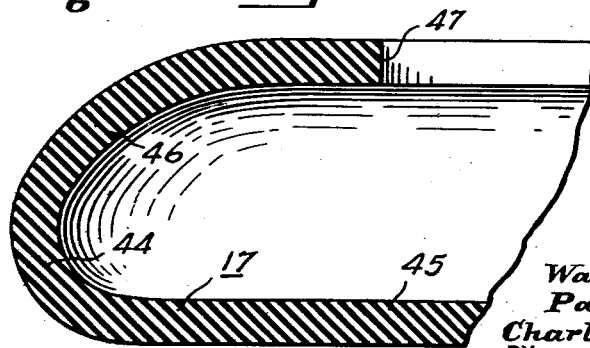

Other objects, uses and advantages of the invention will become apparent to those skilled in the art from the following description and claims and from the drawings in which:

FIGURE 1 is a fragmentary end elevational view of the hydraulic press of the present invention on a reduced scale with parts omitted and parts broken away and shown in section;
FIGURE 2 is a fragmentary longitudinal vertical sectional view with parts broken away and with parts omitted taken substantially on the line 2—2 of FIG. 1;
FIGURE 3 is a fragmentary transverse vertical sectional view of the press shown in FIG. 1 on a larger scale;
FIGURE 4 is a top plan view on a reduced scale showing the rubber diaphragm;
FIGURE 5 is a side elevational view of the diaphragm shown in FIG. 4 and on the same scale;
FIGURE 6 is a fragmentary vertical sectional view taken on the line 6—6 of FIG. 5 and on a larger scale;
FIGURE 7 is a top plan view on a reduced scale of the rubber forming pad of the present invention;
FIGURE 8 is a side elevational view of the pad shown in FIG. 7 on the same scale;
FIGURE 9 is a fragmentary vertical sectional view taken on the line 9—9 of FIG. 8 and on a larger scale;
FIGURE 10 is a fragmentary vertical sectional view of the press on the same reduced scale as FIG. 9 showing the parts in their retracted positions when no pressure is applied to the forming pad;
FIGURE 11 is a fragmentary transverse vertical sectional view on a reduced scale with parts broken away showing an improved form of press according to the present invention, the parts being shown in their positions when no pressure is applied to the press;
FIGURE 12 is a fragmentary transverse vertical sectional view of the press shown in FIG. 11 on the same scale showing the position of the parts when the press is subjected to normal operating pressure and the rubber parts are compressed during forming of articles in the press;
FIGURE 13 is a fragmentary longitudinal vertical sectional view similar to FIG. 12 and on the same scale showing the position of the parts when the press is subjected to normal operating pressure;
FIGURE 14 is a top plan view of the press on a reduced scale with parts omitted;
FIGURE 15 is a top plan view on a reduced scale of the diaphragm employed in the press of FIGS. 11 to 14;
FIGURE 16 is a fragmentary longitudinal vertical sectional view taken on the line 16—16 of FIG. 15 and on a larger scale;
FIGURE 17 is a top plan view on a reduced scale of the resilient deformable forming pad employed on the press of FIGS. 11 to 14 and its rigid rim member;
FIGURE 18 is a fragmentary longitudinal vertical sectional view taken on the line 18—18 of FIG. 17 and on the same scale as FIG. 16;
FIGURE 19 is a fragmentary top plan view on a reduced scale of the sealing gasket employed on the press of FIGS. 11 to 14 with parts broken away; and
FIGURE 20 is a fragmentary vertical sectional view of the gasket taken on the line 20—20 of FIG. 19 and on a larger scale.

Referring more particularly to the drawings in which the parts are identified by the same numerals throughout the several views, FIGS. 1 and 2 show a high-pressure hydraulic press having an outer laminated confining ring 1 made up of a series of concentric metal cylinders and upper and lower flat vertical end plates 2 and 3 located at opposite ends of the press and bolted or otherwise rigidly connected to the opposite ends of the ring 1. A circular hole 4 may be provided in each plate 2 at each side of the press to facilitate lifting and moving of the press. The press ring 1 is accurately machined and ground to provide an internal cylindrical surface 5 which extends between the end plates 2.

Rigid upper and lower metal filler blocks 6 and 7 are mounted within the press cylinder 1 with their flat vertical end faces engaging the flat surfaces of the end plates 2 and 3. The filler blocks are provided with external semi-cylindrical surfaces with the same radius as the surface 5 as best shown in FIG. 1 so as to engage the latter surface throughout the width of the filler blocks when pressure is applied to the work. The lower surface of the block 6 is horizontal and parallel to the flat upper surface of the block 7, and the side portions of the blocks are notched to provide ways or steps which in the assembled machine receive the parallel longitudinal portions 8 of the endless hollow rectangular pad-retainer ring or block 9 and for preventing radial movement of said longitudinal portions relative to the press cylinder 1. The portions 8 have semi-cylindrical surfaces of the same radius as the surface 5 of the press cylinder so as to conform to said surface.

The ends of the portions 8 extend beyond the ends of the blocks 6 and 7 and are integrally joined by thick transverse portions 51 of rectangular cross section having a height less than that of the portions 8 so as to provide an endless structure having sufficient strength to withstand the high pressures within the press (which can stretch the portions 8 more than one-sixteenth of an inch longitudinally). The portions 8 are provided with notches 52 near their opposite ends to receive the vertical end plates 2 as best shown in FIG. 2.

The transverse portions 51 of the rectangular metal block 9 project a short distance inwardly between the filler blocks 6 and 7 and have flat vertical faces 10 which are parallel to the flat vertical faces of the plates 2 and 3. The horizontal upper faces of the portions 51 are located in a first plane a short distance below the lower horizontal surface of the filler block 6 and the flat horizontal bottom surfaces of the portions 51 are located in a second plane that is spaced from the horizontal upper surface of the block 7 to provide room for a rigid rectangular horizontal metal filler block 11.

The block 11 has a flat bottom surface that rests on the lower block 7 and has a flat horizontal upper surface that extends the length of the block 7 and that is spaced below the portion 51 to provide room for a flat rigid horizontal metal press table 12 which as shown herein extends beyond the ends of the longitudinal portions 8 of the pad-retainer ring 9. The upper edges of the lower plates 3 are just below the upper surface of the filler block 11 so as to permit sliding of the block longitudinally into and out of the press.

As shown in FIGS. 1 and 2, the horizontal bottom and top surfaces of the filler blocks 6 and 11, respectively, and the flat vertical inner surfaces of the longitudinal portions 8 and the transverse portions 51 define a chamber or receptacle of rectangular longitudinal and transverse vertical cross section. A pressure pad assembly is mounted in said chamber including an upper rigid metal plate 13, a rigid endless rectangular metal pad-support ring 14 of tapered cross section, a rigid steel rim member 15 resting on the pad support ring 14 below the marginal portion of the plate 13, an elastic rubber sealing gasket 53 resting on the rim member, a thick elastic rubber forming pad 16 vulcanized to the rim member throughout its circumference, an elastic rubber diaphragm or inflation bag 17 above the pad, a flat horizontal rigid metal plate 18 for clamping the marginal portions of the diaphragm against the plate 13, and a pair of horizontal longitudinal spacer bars 49 for supporting the pad support ring 14.

In view of the large size of the rubber parts and the high pressures involved in a 20,000 ton direct-acting press of the type shown herein during the forming of aluminum and steel parts, the design of the forming pad assembly is very important. It is particularly important to prevent rupturing of the bond between the rim member 15 and the rubber forming pad and to provide a pad having a long useful life. The press of the present invention is constructed so that the pressure pad assembly will last for a maximum period of time without replacement of parts.

The rectangular pad-support ring 14 is of uniform cross section through its circumference and extends the full length and width of the rectangular chamber so as to provide a rigid stationary support for the pad rim member 15 that extends throughout the periphery of the forming pad 16. The spacer bars 49 rest upon elevated guide portions 50 of the lower block 7 that engage the opposite sides of the filler block 11 and have horizontal upper surfaces that engage the flat bottom surfaces of the pad-support ring 14 to support said ring.

The pad-support ring has a horizontal notch or ledge of a size to receive the pad rim member 15 and has rounded top portions 19 that project upwardly a short distance above the bottom edge of the member 15. The ring 14, as shown herein, also has a tapered pyramidoidal inner surface tangent to the arcuately curved surfaces of the top portions 19 and that extends from said top portions to the flat bottom surface of the pad-support ring. When the press is in operation, the pad-support ring 14 engages the flat upper surfaces of the press table 12, said table being supported by the filler block 11 and the soft metal wearing strips 20 and 21 above and below said filler block.

The rectangular portion of the press table 12 inwardly of the pad-support ring 14 is thicker than the marginal portions of the table and has a flat horizontal upper surface 22 that is normally above the bottom surfaces of the pad support ring and that extends the full distance between the parallel portions of said pad-support ring. The thickened portion of the metal press table, therefore, provides shoulders which fit within the pad support ring 14 to prevent horizontal movement of the table during the forming of articles and which may readily be moved below the pad-support ring when the table is removed.

As shown in FIGURE 2, there is a generally pyramidoidal chamber 23 formed within the pad-support ring 14 and between the bottom surfaces of the forming pad 16 and the upper surface of the press table 12. This chamber is large enough to receive a plurality of sheet metal articles to be formed together with a plurality of dies and throw pads.

A rectangular elastic rubber filler ring 54 of normally square cross section extends throughout the periphery of the rectangular pad support ring 14 as shown in FIGS. 1 to 3, the outer vertical faces of the rubber ring 54 being contigous to the pad support ring. The rubber ring is mounted on an endless rectangular sealing strip 55 of spring steel or other suitable sheet metal which is rigidly connected to the table 12 by a series of screws 61 and which extends throughout the periphery of the ring 14. The metal sealing strip is of substantially uniform cross section throughout its periphery and has an outer vertical flange 56 adjacent the inner surface of the ring 14 and an inner flange 57 that is bent outwardly toward the ring 14 to grip the rubber ring 54. The rubber ring is provided with a tapered peripheral groove 58 for receiving the inner metal flange.

A rubber throw pad may be mounted above the articles being formed in the press to extend the useful life of the forming pad 16. However, the press will function effectively even when such throw pads are omitted as in FIG. 3.

When it is desired to slide the press table 12 out of the press, the filler block 11 is slid longitudinally from between said table and the lower block 7, being guided by the bars 49 and the raised portion 50 so that the table and the articles thereon may be dropped below the pad support ring 14. With the block 11 removed there is sufficient space between the block 7 and the pad retainer ring 9 to permit sliding of the press table 12 and the rubber ring 54 and the dies thereon longitudinally to remove the shaped articles from the press and to insert new articles into the press. After the press table is returned to its original position, the filler block 11 is replaced.

The upper plate 13 has a marginal portion of increased thickness that is of substantially uniform cross section throughout its periphery. Said marginal portion is shaped to provide a rounded peripheral shoulder 26 that is coextensive with the pad rim member 15, the arcuately curved surface of said shoulder being tangent to the flat horizontal bottom surface of the upper plate 13 so as to provide a smoothly curved surface for engaging the diaphragm 17 and a flat surface for engaging the clamping plate 18. The marginal edge portion of said diaphragm extends between the plates 13 and 18 and is held in a fixed position against the plate 13 by the plate 18 which is held against the upper plate by means of screws 27 or the like.

The pad rim member 15 is securely held in a fixed position by the upper plate 13, the sealing gasket 53 and the pad support ring 14. The sealing gasket is normally compressed between the upper plate and the pad rim member so as to press said rim member down against said pad support ring. The volume of rubber in the sealing gasket is sufficient to fill the space between the pad rim member and the marginal portion of the plate 13 when the rubber forming pad is subjected to maximum pressure as shown in FIG. 3.

At least one metal strip is provided on the sealing gasket to prevent extrusion of the rubber of the gasket between the metal parts. As herein shown, the endless gasket 53 is provided with upper metal strips 59 that extend at its upper edge substantially throughout the periphery of the gasket 53 and at its lower edge with lower metal strips 60 of similar extent, the cross section of the gasket being generally as shown in FIG. 10 which is drawn substantially to scale.

The pad rim member 15 may be made of various strong inextensible materials and may be sectional, but is preferably formed as an endless ring of steel or other strong rigid metal which may be effectively bonded to rubber. The forming pad 16 may have a thickness throughout the major portion of its length and width not substantially less than the axial height of the rim member 15 and is preferably vulcanized to the rim member for an axial distance at least about equal to said thickness. As herein shown, the rectangular forming pad is made of a homogeneous elastic rubber and is vulcanized to the rim member throughout its periphery, the bond between the rim member and the rubber having an axial width throughout the periphery of the pad not substantially less than the thickness of the central or interior portion of the pad. Said pad may save a thickness at its outer edge not substantially less than the average thickness of said interior portion.

The rim member 15 and the pressure pad 16 are best shown in FIGS. 7 to 9. The pad rim member may be split or sectional but is preferably endless and made of a strong rigid material, such as steel or other metal, which may be vulcanized to rubber to provide a strong bond. As herein shown, the rim member 15 has upper and lower edges located in planes located equal distances from the medial plane of the pressure pad and so that the pressure pad may be reversed and used in the upside-down position. Portions of the rim member are arcuately curved to provide rounded shoulders 28 and to insure that the rubber will not separate from the rim member at the corners.

The forming pad 16 is made of an elastic rubber-like material which may be deformed under high pressure to cause the sheet metal blank to conform to the shape of its die 24. The material is preferably a durable flexible incompressible elastic rubber which provides a deformable homogeneous pad. Excellent results may be obtained where the vulcanized pad 16 consists of a homogeneous elastic tread rubber with a durometer of about 60 to 70, but rubber of lower durometer hardness may be used particularly where a throw pad or a facing layer is interposed between the forming pad and the article being formed to reduce damage to the pad.

It is preferable to employ elastic rubber throw pads to cover the articles being formed in the press and to protect the forming pad against cutting and excessive abrasion since they substantially increase the life of the forming pad and are readily replaceable when they are worn out. The throw pads may be made of a highly flexible insulating material such as silicone rubber where the articles are at elevated temperatures so as to protect the forming pad from the damaging effect of the heat. The pad may also be provided with a facing of silicone rubber but throw pads are usually preferred.

The rubber forming pad 16 is vulcanized to the rigid rim member 15 throughout its periphery to provide a strong bond of maximum area. Before vulcanization the peripheral edge surface of the forming pad may be coated with a suitable rubber-to-metal adhesive in the conventional manner so that an effective bond will be provided. Alpha brass plating may be employed or other conventional methods may be used to obtain a bond of maximum strength. In the press shown in FIGS. 1 to 3, the peripheral edge surface of the forming pad has a uniform width throughout its periphery in the neighborhood of about six inches and is vulcanized to the rim member 15 throughout its area.

The forming pad 16 may have different sizes and shapes while obtaining the benefit of the present invention. A circular pad is durable and will function efficiently, but it is preferable to employ a generally rectangular pad in a press of the character described herein that is constructed for easy assembly and disassembly. The forming pad preferably has a length of about 8 to 12 feet, a width of about 3 to 6 feet, an average thickness of about 4 to 8 inches, and a minimum thickness in the neighborhood of about 3 inches.

The marginal portion 29 of the pad is necked down and reduced in thickness throughout the periphery of the pad to provide a marginal recess 30 with a maximum depth of at least one-half an inch or so which gradually decreases in depth toward the rim member 15. The minimum thickness of the marginal portion 29 is preferably about 20 to 40 percent less than the average thickness of the pad and/or the thickness of the central portion 31 of the pad so as to facilitate flexing of said marginal portion during operation of the press and to avoid rupturing of the bond between the pad 16 and the rim member 15.

It will be apparent that the rubber forming pad may be of various shapes and sizes particularly where the pad is unsymmetrical. As herein shown, the pad 16 in its normal unstressed condition as shown in FIG. 9 is symmetrical about its horizontal medial plane, two endless marginal recesses 30 and two endless projecting peripheral portions 32 of the same size being provided. A symmetrical pad has the advantage that it may be turned upside down or reversed to obtain a maximum useful life from the pad.

As herein shown, the central portion 31 of the pad 16 has a uniform thickness of six inches to provide flat upper and lower faces 33 of substantially rectangular form that are parallel to the edges of the rim member 15 and that extend to within about five inches of the rim member on each side thereof. The marginal portion 29 has a vertical cross section throughout the periphery of the forming pad which may be the same as shown in FIG. 9. The pad gradually decreases in thickness outwardly of the central portion 31 to provide smoothly curved tapering surfaces 34 tangent to the horizontal surfaces 33 and the horizontal bottom surfaces 35 of the marginal grooves 30. As herein shown, the minimum thickness of the pad and the distance between the surfaces 35 is about four inches, but it will be apparent that the size of the pad may vary considerably even when the pad is symmetrical.

The pad gradually increases in thickness outwardly of the surfaces 35 to form the endless peripheral portions 32 which have arcuately curved surfaces 36 tangent to the surfaces 35. As shown in FIG. 9, the surfaces 36 have a constant radius of curvature and are almost tangent to the inner vertical surface of the rim member 15. The surfaces 34, 35 and 36 define the bottom and side walls of the peripheral recesses 30 and extend horizontally a short distance from the rim member 15 to the flat surface 33. This distance is preferably less than one-third the width of the forming pad and may be as small as five inches in a symmetrical pad of the type shown in FIG. 9.

Means is provided in the press of the present invention for forming an expansible fluid-tight chamber above the forming pad 16 to apply high pressure to the pad. Although a tubeless construction is possible, such means preferably includes an inflatable bag or tube of flexible elastic rubber-like material or a rubber-like diaphragm. Hydraulic fluid under a high pressure (for example, 5,000 to 6,500 pounds per square inch) may be supplied to the expansible chamber in a suitable manner to effect operation of the press. As herein shown, the upper half-moon filler block 6 is provided with a longitudinal cylindrical bore 37 to receive an elbow 38 and a horizontal fluid supply pipe 39 which extends through a slot 40 in the plate 2 to a suitable source of hydraulic fluid under high pressure. The block 6 is also provided with a vertical cylindrical bore 41 to receive a vertical pipe 42 that is connected to the elbow 38, said pipe having a circular flange 43 that engages the bottom of the block 6 to limit upward movement of the pipe and the elbow. The flange has a tight fit in a circular opening in the plate 13, and the lower end portion of the pipe has a close fit in a circular opening in the plate 18 as shown in FIG. 3 so that there is no substantial leakage around the inlet fitting.

The diaphragm 17 is molded as a single piece of flexible and extensible elastic homogeneous rubber having marginal portions which may be clamped between metal members to seal the chamber formed by the diaphragm and the metal parts of the press. Like the pad 16, the diaphragm 17 is preferably generally rectangular and preferably has a width of about three to six feet and a length of about eight to twelve feet; but, unlike the pad, the average thickness of the diaphragm is preferably not in excess of about five-eighths of an inch. It will be apparent that the thickness of the diaphragm may vary considerably and that said thickness may be increased toward the margins of the diaphragm. The diaphragm 17 shown in FIGS. 4 to 6 has a substantially uniform thickness in the normal unstressed condition of about three-eighths of an inch. The marginal portion of the diaphragm has a uniform vertical cross section throughout its periphery which may be the same as shown in FIG. 6. As shown herein, the rubber diaphragm is molded with a horizontal rectangular bottom wall 45 of uniform thickness which integrally joins the marginal portion 44 within one or two inches of the outer periphery of the diaphragm and with an inturned marginal portion which provides a peripheral side wall 46 of rounded cross section and uniform thickness. The side wall 46 is integrally joined to the peripheral portion 44 and has a marginal vertical edge 47 of substantially rectangular form for insertion between the upper plate 13 and the marginal portion of the clamping plate 18. When the diaphragm is in position in the press and is subjected to hydraulic fluid under high pressure, the wall 46 conforms to the shape of the rounded concave shoulder 26 of the plate 13 and the central portion 45 conforms to the shape of the underlying central portion 31 of the forming pad. The sealing gasket 53 completely fills the space between the marginal portion 26 of the plate 13 and the pad rim member 15 to prevent pinching of the diaphragm by the metal parts so that the diaphragm has a maximum useful life. The life of the diaphragm may be further extended due to the design of the top surface of the forming pad. It will be noted that the bottom surface of the diaphragm 17 is held in a concave position when the forming pad 16 is in its normal unstressed condition as shown in FIGS. 1 and 2 so that stretching of the rubber wall 45 is minimized during forming of articles in the press.

Any suitable hydraulic fluid which does not damage the diaphragm 17 may be employed in the pressure chamber above the pad 16. Such fluid may be a hydraulic oil, in which case the rubber for the diaphragm is an oil-resistant type which is not damaged by such oil.

FIGURES 11 to 20 show details of construction of a modified form of hydraulic press according to the present invention which is identical to the press of FIGS. 1 to 3 except that the forming pad assembly within the retainer ring 9 and between the table 12 and the upper block 6 has been replaced by a different assembly. The assembly comprises, in addition to the spacer bars 49, an upper rigid metal plate 13a, a rigid endless rectangular metal pad-support ring 14a, a rigid metal rim member 15a resting on the pad-support ring, an elastic rubber sealing gasket 153 resting on the rim member, an elastic rubber forming pad 16a vulcanized to the rim member throughout its circumference, an elastic rubber diaphragm or inflation bag 17a above the pad, and a flat horizontal rigid metal plate 18a for clamping the marginal portions of the diaphragm against the plate 13. FIGURES 11 to 13 are drawn substantially to scale so that the size of the parts and their operation will be apparent upon inspection.

The rectangular pad support ring 14a is of uniform cross-section throughout its periphery and fits against the inner surfaces of the pad retainer ring 8, being supported by the spacer bars 49. The ring has a rounded upper surface 63 for engaging the forming pad 16a and flat vertical inner faces 64 tangent to the surface 63. The surfaces 64 are parallel to and spaced a short distance from the flat vertical outer faces of the rubber filler ring 54 as shown in FIG. 11 throughout the inner periphery of the rectangular ring 14a so as to provide a narrow clearance space 65 to permit insertion and removal of the table 12 and the rubber ring 54 attached thereto. The flange 56 of the spring metal strip 55 has a height greater than the width of said clearance space and engages the pad support ring 14a during the application of high pressure as shown in FIG. 12 so as to prevent extrusion of rubber between the table 12 and the ring 14a into the space 66 above the wear strip 67. The height of the flange 56 is substantially greater than the maximum clearance between the table 12 and the ring 14a so that the rubber cannot extrude between these parts even if the pad retainer ring 9 were to stretch as much as one-tenth of an inch longitudinally.

It will be noted that a clearance 68 exists between the end portions 51 of the ring 9 and the ends of the plate 13a when high pressure is applied to the press as indicated in FIG. 13 due to longitudinal stretching of the side portions 8 of said ring, but that no substantial clearance exists between the plate 13a and the side portions 8 (see FIG. 12) due to the relatively small radial expansion of the press cylinder 1 under the same pressure. At zero pressure, of course, there is no clearance and the plate 13a and the overlying filler block 6 engage the ring 9 throughout its inner periphery as indicated by FIG. 11.

The outer portion of the pad support ring 14a is shaped the same as the ring 14 and is provided with a peripheral ledge for supporting the pad rim member 15a, said pad support ring having the same vertical cross section throughout its periphery. The ledge has a flat horizontal surface 69 with a width corresponding to that of the narrow lower portion 70 of the rim member 15a. The pad support ring 14a also has a vertical surface 71 tangent to the curved surfaces 63 and engaging the inner vertical surface 72 of the rim meber 15a. The vertical outer surface 73 of the ring 14a engages the retainer ring 9 throughout its height and periphery.

The outer vertical surface 74 of the pad rim member 15a also engages the ring 9 throughout its periphery. It is preferable to hold the rim member against the inner surface of the ring 9 by means of a series of studs or bolts. As herein shown, the ring 9 and the press cylinder 1 are provided with a series of aligned openings 75 and 76 to receive a series of long studs 77 spaced around the periphery of the rim member 15a. The rim member is provided with a series of internally threaded openings 78 to receive the externally threaded inner end portions of the studs, and nuts 79 are screwed onto the externally threaded outer end portions of the studs to tighten the rim member against the ring 9. The rim member 15a has a thickened upper portion 80 containing the holes 78 and has a uniform cross section throughout its circumference as shown in FIG. 18 which is drawn to scale. The upper surface of the rim member comprises a sloping portion 81 and a flat horizontal portion 82.

The elastic rubber forming pad 16a is made of the same material as the pad 16 and has substantially the same external dimensions. The pad 16a preferable has a length of about 8 to 12 feet, a width of about 3 to 6 feet, an average thickness of about 4 to 8 inches, and a minimum thickness greater than three inches. Said pad is vulcanized throughout its circumference to the rim member 15a and is reduced in thickness near its margin like the pad 16. However, the pad 16a is not symmetrical. The rectangular central portion 82 of the pad normally has a uniform thickness not substantially greater than the height of the rim member 15a and extends more than one-third the width and more than two-thirds the length of the pad. The pad has a marginal groove in its upper face with a normally pyramidoidal surface 83, a normally flat horizontal surface 84 that extends throughout the periphery of the pad, and a rounded marginal surface 85. The bottom surface 86 of the pad 16a is normally horizontal and flat to within a few inches of the marginal edge of the pad as shown in FIG. 11 which is drawn substantially to scale. It will be apparent that the outer portion of the rubber pad normally has substantially the same cross-section throughout as shown in FIGS. 11 and 18. The bottom part of the forming pad 16a is provided with a marginal groove having a rounded surface 87 that conforms to the shape of the rounded surface 63 of the pad support ring, whereby the marginal portion 88 of the pad has a thickness less than that of the outer portion 89.

The intermediate outer portion 89 preferably has a thickness 10 to 25 percent less than the central portion 82 and the marginal portion 88 preferably has a minimum thickness that is 20 to 40 percent less than that of said central portion. However, the area of the bond between the rim member 15a and the marginal edge face or surface of the pad 16a preferably has a substantially uniform vertical height throughout the periphery of the pad greater than the thickness of the outer portion 89 and not substantially less than the average thickness of the pad. As herein shown, said bond area has a height not substantially less than that of the central portion 82, the outer portion 89 has a thickness about one-sixth less than that of said central portion, and the marginal portion 88 has a minimum thickness about one-third less than that of said central portion.

In the press shown herein the pad 16a has a length of about 10 feet and a width of a little over 4 feet and the central portion 82 of the pad has a thickness of six inches, but it will be apparent that the size of the pad may vary considerably.

The forming pad 16a is completely covered by the thin homogeneous impervious elastic rubber inflation bag or diaphragm 17a. As shown herein, said diaphragm comprises a main central body portion 90 of normally uniform thickness and substantially rectangular shape, an upstanding marginal portion 91 having a uniform thickness greater than that of said body portion and having an internal horizontal flange 92, and an outer portion 93 integrally connecting the portions 90 and 91 and gradually increasing in thickness in an outward direction.

FIGURES 15 and 16 show the diaphragm in its normal unstressed condition, the portion 93 being bowed as shown in FIG. 16 throughout the periphery of the diaphragm due to the fact that the part of the diaphragm within the vertical marginal portion 91 has a surface with a length and width substantially greater than the length and width of the portion 91. The length and width of the diaphragm 17a may be the same as that of the pad 16a but the average thickness of the diaphragm is only a small fraction of the thickness of said pad and is preferably less than five-eighths of an inch. The central body portion 90 of the diaphragm preferably has a thickness of about one-quarter to one-half of an inch and the outer portions 91 and 93 preferably have an average thickness not substantially in excess of about three-fourths of an inch.

The marginal portion of the upper plate 13a is formed to provide a vertical flange 94 which has a uniform vertical cross section throughout the periphery of the plate as shown in FIGS. 11 to 13. The flange 94 is shaped the same as the upper portion of the rim member 15a and has the same thickness as is apparent from the drawings, the lower surface of said flange having tapered and flat surfaces corresponding in size and shape to the surfaces 81 and 82 of the rim member.

The flat metal clamping plate 18a extends to within a fraction of an inch of the flange 94 and is held against the flat bottom surface of the plate 13a by a series of screws 95, the marginal portion 96 of the clamping plate being spaced from said flat bottom surface a distance substantially less than the normal thickness of the elastic rubber flange 92 of the diaphragm so that said rubber flange is compressed to form an air-tight seal at the margin of the diaphragm. As herein shown, the rubber flange 92 is compressed throughout the periphery of the diaphragm to about two-thirds its original thickness by the clamping plate so that no fluid can leak from the high pressure chamber above the pad 16a during the forming of articles in the press.

Due to the bulge in the outer portion 93 of the unstressed diaphragm 17a, the portions 90 and 93 of said diaphragm which engage the top of the pad 16a have a surface area at least as great as that of the top surface of said pad so that the diaphragm is not subjected to tensile stresses when the press is in the condition indicated in FIG. 11. Said diaphragm surface area is preferably greater than said pad surface area so that the diaphragm is under a slight compression when it lies against the pad as shown in FIG. 11. This reduces the tensile forces on the diaphragm when the pressure is applied as indicated in FIGS. 12 and 13. The convex shape of the upper surface of the pad 16a also minimizes these tensile stresses.

The sealing gasket 153 is designed to prevent extrusion of the diaphragm 17a between the flange 94 and the pad rim member 15a and has a normal cross-sectional area before mounting in the press at least equal to the maximum area of the space between said flange and said rim member. Since the materials of the gasket are incompressible, the gasket completely fills said space when maximum pressure is applied as indicated in FIGS. 12 and 13.

FIGURES 19 and 20 show the gasket 153 in its normal unstressed condition prior to assembly between the pad rim member 15a and the plate 13a. The gasket comprises a flexible elastic strip 100 of homogeneous incompressible rubber and upper and lower steel strips 101 and 102 bonded to the rubber strip substantially throughout its periphery.

The central portions 103 of the gasket are unreinforced and free to stretch so that the strips 101 and 102 remain in engagement with the transverse portions 51 of the retaining ring 9 as the ring stretches longitudinally (see space 68) the opposite ends of each strip 101 and 102 being located adjacent the central portions 103. On each side of the portions 103, the gasket 153 has the same vertical cross section throughout as shown in FIG. 20 which is drawn to scale.

As shown in FIG. 13, the horizontal width of the metal strips 101 and 102 is greater than the maximum width of the space 68 and the maximum stretch of the ring 9 so that the strips 101 cover the space to prevent extrusion of the rubber into said space. As herein shown, said metal strips are one-eighth of an inch square. The portions 103 have a small axial length so that very little rubber can enter the space 68. Such length is usually not substantially greater than one or two inches.

When the press is subjected to the maximum operating pressure as indicated in FIGS. 12 and 13 so as to stretch the retaining ring a substantial amount (for example, up to 0.08 inches,) the sealing gasket 153 completely fills the space between the metal flange 94 and the underlying rim member 15a so that the diaphragm 17a is not pinched between metal parts, the vertically aligned edges of said flange and said rim member being rounded so that they will not cut the diaphragm or the rubber strip 100. Therefore, the normal cross-sectional area of the gasket is at least equal to the maximum cross-sectional area of said space.

Since said space is much smaller when the pressure is removed from the press, the incompressible rubber material of the gasket is placed under compression between the flange 94 and the rim member 15a when the press is assembled as indicated in FIG. 11 and a portion 104 of the sealing strip bulges inwardly against the diaphragm 17a. The extra rubber in the portion 104 compensates for the increase in the size of the marginal space between the flange 94 and the rim member 15a when pressure is applied so that the diaphragm cannot move into said space.

The rubber materials employed for the forming pads 16 and 16a, the diaphragms 17 and 17a, and the sealing gaskets 53 and 153 may vary considerably. However, such materials should be flexible and elastic and should have substantial abrasion resistance and fatigue resistance. The forming pad, the throw pad and the sealing gasket may be made from high quality, abrasion-resistant rubber having a durometer hardness in the neighborhood of about 50 to 70. The diaphragm 17a, however, must be made of a rubber which is not subject to swelling and degradation or otherwise damaged due to contact with the oil or other hydraulic fluid used in the pressure chamber. Such rubber should have maximum elongation and maximum flex-cracking resistance. The diaphragm is often made of neoprene when the hydraulic fluid is an oil.

It will be understood that the above description is by way of illustration rather than limitation and that, in accordance with the patent statutes, variations and modifications of the specific devices disclosed herein may be made without departing from the spirit of the invention.

Having described our invention, we claim:

1. In a hydraulic press having a horizontal elastic forming pad and means for forming an expansible pressure chamber above said pad including a stationary rigid member above said pad and a thin elastic diaphragm covering said pad and extending upwardly above the mrginal portions of said pad, the improvement which comprises: a rigid rim member surrounding said pad and vulcanized to the marginal edge surface of said pad throughout the width and perimeter thereof, and a sealing gasket surrounding said diaphragm having an elastic rubber body portion compressed between said rigid member and said rim member and having an inextensible portion at its outer edge to prevent extrusion of said body portion when high pressure is supplied to said chamber.

2. A hydraulic press having a retainer ring with internal vertical surfaces providing a substantially rectangular enclosure, a forming pad of elastic rubber extending the full length and width of said enclosure, a rigid rim member having an inner face vulcanized to the marginal face of said forming pad and an outer face engaging said vertical surfaces substantially throughout the periphery of said enclosure, means for holding said rim member in a fixed position in said enclosure, a rigid upper member in said enclosure having a marginal portion overlying said rim member and having vertical outer surfaces normally engaging the vertical inner surfaces of said retainer ring substantially throughout the periphery of said enclosure, and a sealing gasket of elastic rubber-like material mounted in the space between said marginal portion of said upper member and said rim member and completely filling said space, said sealing gasket comprising a main body portion of elastic material and rigid upper and lower outer edge portions of inextensible material which are spaced apart to permit deformation of said gasket and relative movement of said edge portions, said rigid portions bridging the gap between said rim member and said retainer ring and the gap between said upper rigid member and said retainer ring when the press is under pressure so that the elastic portions of the gasket cannot be extruded into said gaps.

3. A hydraulic press having a retainer ring with internal vertical surfaces providing a substantially rectangular enclosure, a forming pad of elastic rubber extending the full length and width of said enclosure, a rigid rim member having an inner face vulcanized to the marginal edge of said forming pad and an outer face engaging said vertical surfaces substantially throughout the periphery of said enclosure, means for holding said rim member in a fixed position in said enclosure, a rigid upper member in said enclosure having a marginal portion overlying said rim member and having vertical outer surfaces normally engaging the vertical inner surfaces of said retainer ring substantially throughout the periphery of said enclosure, a sealing gasket of elastic rubber-like material mounted in the space between said marginal portion of said upper member and said rim member and completely filling said space, and means forming an expansible chamber above said pad including a thin elastic rubber diaphragm for engaging said sealing gasket and the marginal portion of said pad.

4. A hydraulic press comprising a horizontal elastic rubber forming pad having a top face and a marginal edge face, means forming an expansible pressure chamber above said pad including a stationary rigid upper member above said pad and a thin elastic rubber diaphragm, a rigid endless rim member surrounding said pad and vulcanized to the marginal edge face of said pad throughout the perimeter of the pad, said pad having a marginal portion providing an endless marginal recess in the top face thereof adjacent said rim member and having a thickness at its marginal edge face not substantially less than the average thickness of the pad inwardly of said marginal portion, and a sealing gasket surrounding said diaphragm having an elastic rubber body portion compressed between said rigid upper member and said rim number and having an inextensible portion at its outer edge to prevent extrusion of said body portion when high pressure is supplied to said chamber, said diaphragm being positioned to normally conform to and cover said recess and to engage with said sealing gasket and said rigid member.

5. A hydraulic press having a retainer ring with internal vertical surfaces providing a substantially rectangular enclosure, a forming pad of elastic rubber extending the full length and width of said enclosure, a rigid rim member having an inner face vulcanized to the marginal face of said forming pad substantially throughout the width and periphery thereof, means for holding said rim member in a fixed position in said enlosure, a rigid upper member in said enclosure having a marginal portion overlying said rim member and having vertical outer surfaces normally engaging the vertical inner surfaces of said retainer ring substantially throughout the periphery of said enclosure, and a sealing gasket of elastic rubber-like material mounted in the space between said marginal portion of said upper member and said rim member and filling said space, said pad gradually increasing in thickness towards said rim member to provide a rounded upper marginal surface throughout its periphery adjacent said rim member, and means forming an expansible chamber above said pad including a thin elastic rubber diaphragm for engaging said gasket and said upper marginal surface.

References Cited in the file of this patent

UNITED STATES PATENTS

| | | |
|---|---|---|
| 1,885,457 | Lord et al. | Nov. 1, 1932 |
| 2,241,056 | Chilton | May 6, 1941 |
| 2,307,066 | Paulus | Jan. 5, 1943 |
| 2,417,202 | Hull | Mar. 11, 1947 |
| 2,418,393 | Bridgens | Apr. 1, 1947 |
| 2,458,854 | Hull et al. | Jan. 11, 1949 |
| 2,546,403 | Pendleton | Mar. 27, 1951 |
| 2,550,672 | Chyba | May 1, 1951 |
| 2,615,471 | McFarland | Oct. 28, 1952 |
| 2,637,345 | Kraft | May 5, 1953 |
| 2,651,328 | Gamble | Sept. 8, 1953 |
| 2,734,582 | Bagnell | Feb. 14, 1956 |
| 2,741,205 | Paulton | Apr. 10, 1956 |
| 2,762,395 | Lamb | Sept. 11, 1956 |
| 2,771,850 | Wheelon | Nov. 27, 1956 |
| 2,797,758 | Showalter | July 2, 1957 |
| 2,854,940 | Bates | Oct. 7, 1958 |

FOREIGN PATENTS

| | | |
|---|---|---|
| 510,090 | Belgium | Sept. 20, 1952 |
| 1,075,570 | France | Apr. 14, 1954 |